(12) United States Patent
Tamura

(10) Patent No.: US 9,975,383 B2
(45) Date of Patent: May 22, 2018

(54) PNEUMATIC TIRE FOR OFF-ROAD MOTORCYCLE

(71) Applicant: Sumitomo Rubber Industries, Ltd., Kobe-shi, Hyogo (JP)

(72) Inventor: Takuya Tamura, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 260 days.

(21) Appl. No.: 14/838,015

(22) Filed: Aug. 27, 2015

(65) Prior Publication Data
US 2016/0075186 A1 Mar. 17, 2016

(30) Foreign Application Priority Data

Sep. 17, 2014 (JP) ................................. 2014-189249

(51) Int. Cl.
*B60C 11/03* (2006.01)
*B60C 11/11* (2006.01)

(52) U.S. Cl.
CPC ........... *B60C 11/11* (2013.01); *B60C 11/0302* (2013.01); *B60C 2200/10* (2013.01); *B60C 2200/14* (2013.01)

(58) Field of Classification Search
CPC ............. B60C 11/0302; B60C 2200/14; B60C 2011/0313; B60C 11/11
USPC ............................ 152/209.28; D12/536, 544
See application file for complete search history.

(56) References Cited

U.S. PATENT DOCUMENTS

2005/0173036 A1* 8/2005 Rossignaud ........ B60C 11/0311
152/209.11
2010/0236678 A1* 9/2010 Sueishi ................. B60C 11/032
152/209.15

FOREIGN PATENT DOCUMENTS

| EP | 2 204 295 A1 | 7/2010 |
| EP | 2 423 006 A1 | 2/2012 |
| JP | 11-245627 A | 9/1999 |
| JP | 2009-67245 A | 4/2009 |
| RU | WO 9321028 A1 * | 10/1993 ......... B60C 11/0316 |

OTHER PUBLICATIONS

The Extended European Search Report, dated Feb. 1, 2016, for European Application No. 15182486.9 is provided.

* cited by examiner

*Primary Examiner* — Michael H. Wilson
*Assistant Examiner* — Kendra Ly
(74) *Attorney, Agent, or Firm* — Birch, Stewart, Kolasch & Birch, LLP

(57) ABSTRACT

A pneumatic tire for motorcycle for running on rough terrain comprises a tread portion 2 provided with a directional tread pattern having an intended tire rotational direction X. The tread portion 2 is provided with crown blocks 4 and middle blocks 5. The crown block 4 comprises an axially long main portion 4m and a protruding portion 4t protruding from an axial central part of the main portion 4m toward the opposite direction of the intended tire rotational direction. In a block group Y consisting of each crown block 4 and two axially adjacent middle blocks 5 disposed one on each side of the crown block 4, the center P1 of gravity of the crown block 4 is positioned on the toe-side of each middle block 5, and the center P2 of gravity of each middle block 5 is positioned on the heel-side of the crown block 4.

10 Claims, 3 Drawing Sheets

PNEUMATIC TIRE FOR OFF-ROAD MOTORCYCLE

BACKGROUND OF THE INVENTION

The present invention relates to a pneumatic tire for off-road motorcycle, more particularly to a block tread pattern capable of improving transitional characteristics during cornering and the traction performance on rough terrain.

Japanese Patent Application Publication No. 2009-67245 (hereinafter the patent document 1) discloses a pneumatic tire for running on rough terrain which is a directional tire provided in the tread portion with crown blocks disposed on the tire equator, and middle blocks disposed on each side of the crown block in the tire axial direction. The drawings of the patent document 1 show that the middle blocks are arranged with different circumferential pitches from those of the crown blocks, and some of the crown blocks are aligned in line in the tire axial direction with some of the middle blocks.

Therefore, when the tread portion is deflected in the ground contacting patch, the aligned crown block and middle block are liable to contact with each other and to act as if one block. In such case, for example, it becomes difficult to lean the motorcycle body to initiate turning, and if the lean angle increases over a certain value, the motorcycle body is abruptly leant. Thus, there is a problem with transitional characteristics during cornering.

SUMMARY OF THE INVENTION

It is therefore, an object of the present invention to provide a pneumatic tire for motorcycle for running on rough terrain, in which transitional characteristics during cornering as well as the traction performance on rough terrain can be improved.

According to the present invention, a pneumatic tire for motorcycle for running on rough terrain comprises:
a tread portion provided with a directional tread pattern having an intended tire rotational direction,
the tread pattern comprising
crown blocks disposed on the tire equator, and
middle blocks disposed on each side in the tire axial direction of the crown blocks,
each crown block comprising
a main portion having an axially long shape such that the dimension in the tire axial direction is larger than the dimension in the tire circumferential direction, and
a protruding portion protruding from a central part in the tire axial direction of the main portion toward the opposite direction of the intended tire rotational direction, and
in a block group consisting of each crown block and two axially adjacent middle blocks disposed one on each side of the crown block,
the center of gravity of the crown block is positioned on the toe-side of each middle block, and
the center of gravity of each middle block is positioned on the heel-side of the crown block.

The pneumatic tire according to the present invention may have the following features:
(1) the heel-side edge of the tread of each crown block comprises an arc-shaped part curved convexly toward the opposite direction of the intended tire rotational direction;
(2) the tread of each crown block has two axially inner and outer side edges each extending parallel with the tire circumferential direction;
(3) the tread of each middle block has an axially long shape such that the dimension in the tire axial direction is larger than the dimension in the tire circumferential direction;
(4) the heel-side edge of the tread of each middle block comprises an arc-shaped part curved convexly toward the opposite direction of the intended tire rotational direction;
(5) the heel-side edge of the tread of each middle block is inclined to the intended tire rotational direction toward the axially outside;
(6) the tread of each middle block has two axially inner and outer side edges extending parallel with the tire circumferential direction.

In this application including specification and claims, various dimensions, positions and the like of the tire refer to those under a normally inflated unloaded condition of the tire unless otherwise noted.

The tread width TW is the width measured under the normally inflated unloaded condition, as the axial distance between the tread edges Te.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

DESCRIPTION OF THE PREFERRED EMBODIMENTS

An embodiment of the present invention will now be described in detail in conjunction with accompanying drawings.

The present invention is directed to a pneumatic tire for motorcycle.

As well known in the art, a pneumatic tire comprises a tread portion 2, a pair of axially spaced bead portions, a pair of sidewall portions extending between the tread edges Te and the bead portions, a carcass extending between the bead portions through the tread portion 2 and the sidewall portions, and a tread reinforcing cord layer disposed radially outside the carcass in the tread portion.

As a characteristic of a motorcycle tire, the tread portion 2 (inclusive of the carcass, the tread reinforcing cord layer and a tread rubber thereon) is convexly curved so that the tread face between the tread edges Te is curved like an arc swelling radially outwardly, and the maximum cross sectional width of the tire occurs between the tread edges.

The pneumatic tire according to the present invention is a directional tire, and the intended tire rotational direction X is indicated by characters and/or sign in the sidewall portion for example.

Figure 1:
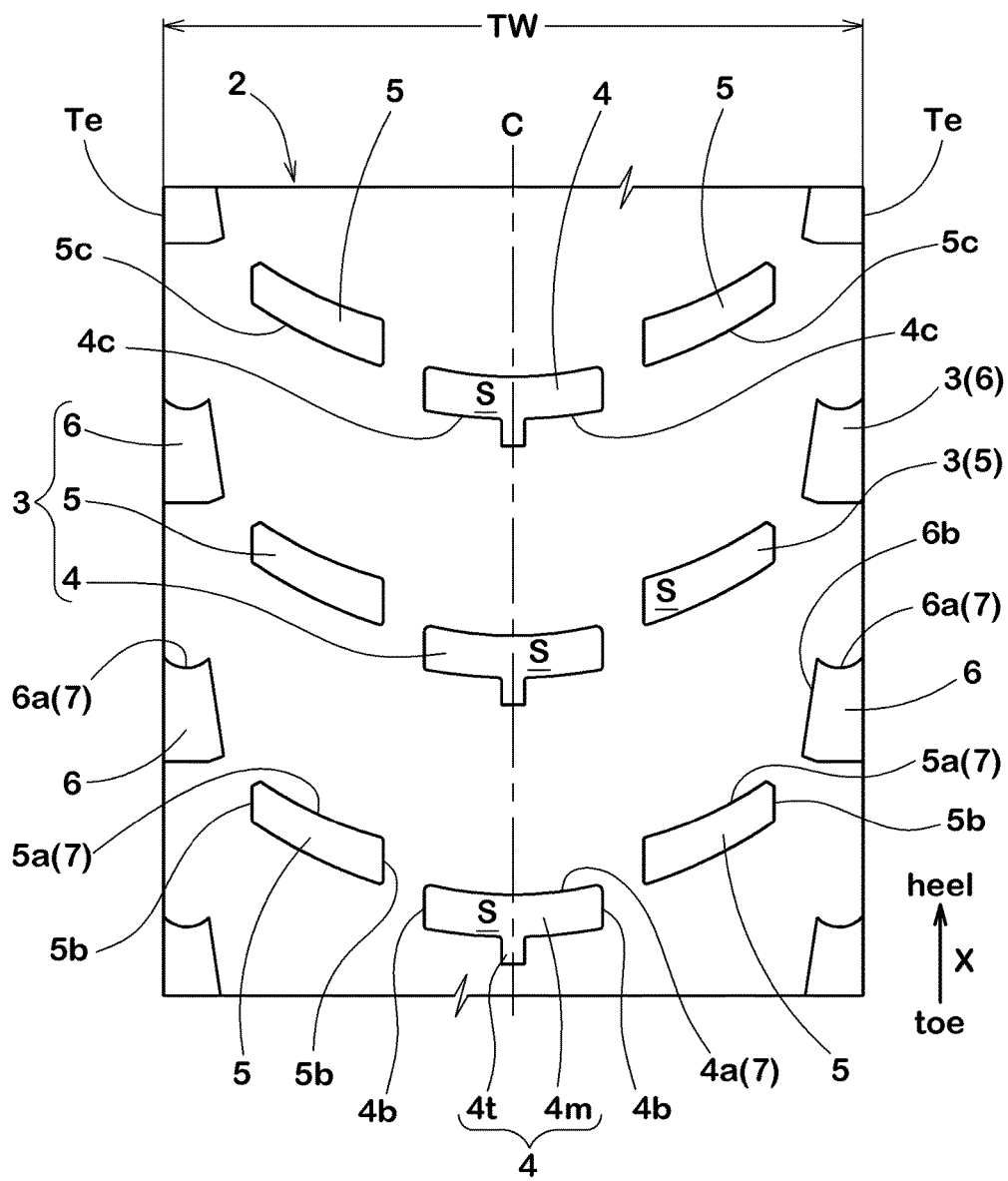
FIG. 1 is a partial developed view of the tread portion of a pneumatic tire as an embodiment of the present invention.

As shown in FIG. 1, the tread portion 2 is provided with a plurality of blocks 3. The blocks 3 include a plurality of crown blocks 4 disposed on the tire equator C, and a plurality of middle blocks 5 disposed on each side in the tire axial direction of the crown blocks 4. In this embodiment, the blocks 3 further include a plurality of shoulder blocks 6 arranged along each tread edge Te.

Figure 2:
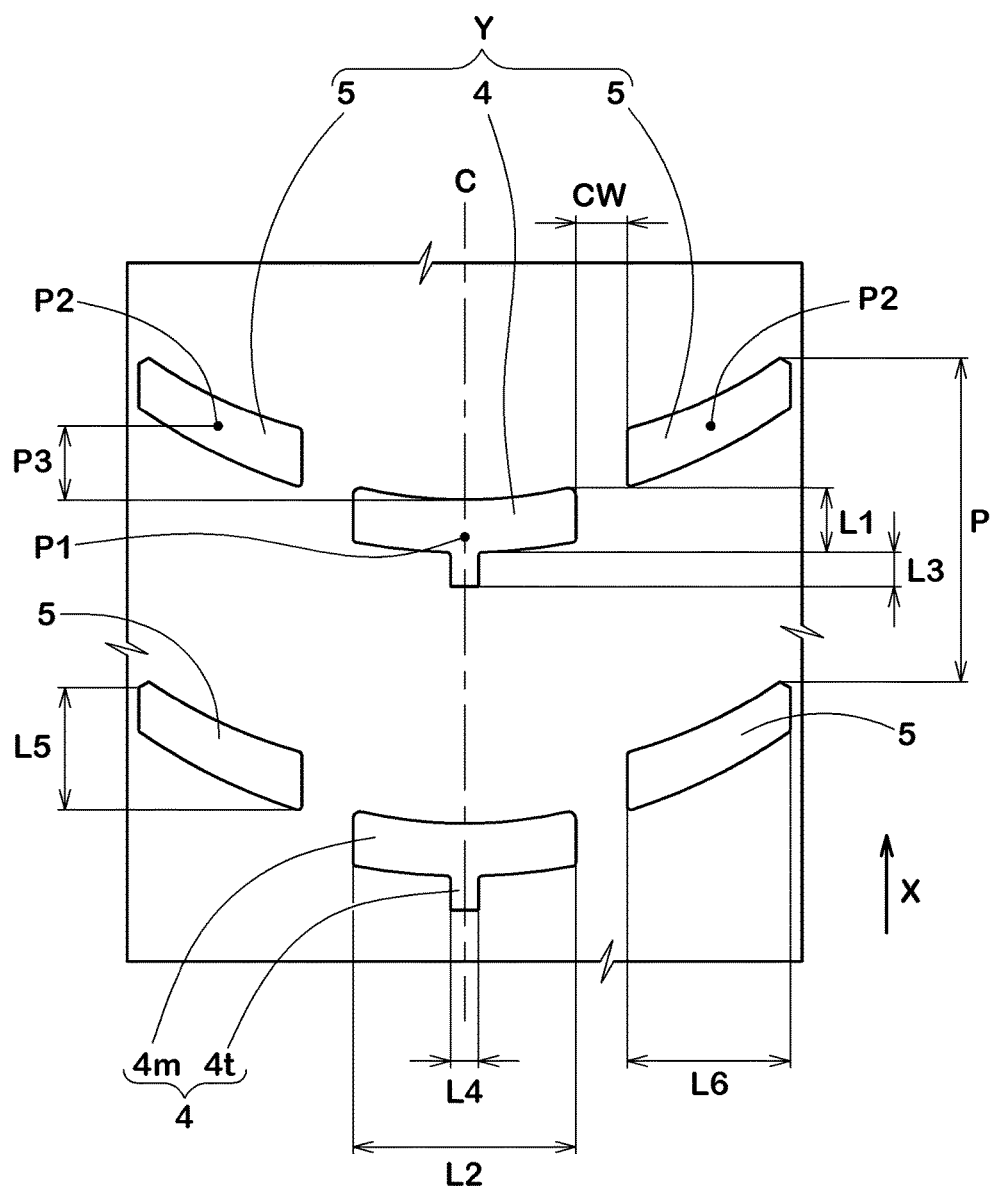
FIG. 2 is a closeup of a tread crown portion in FIG. 1.
Figure 3:
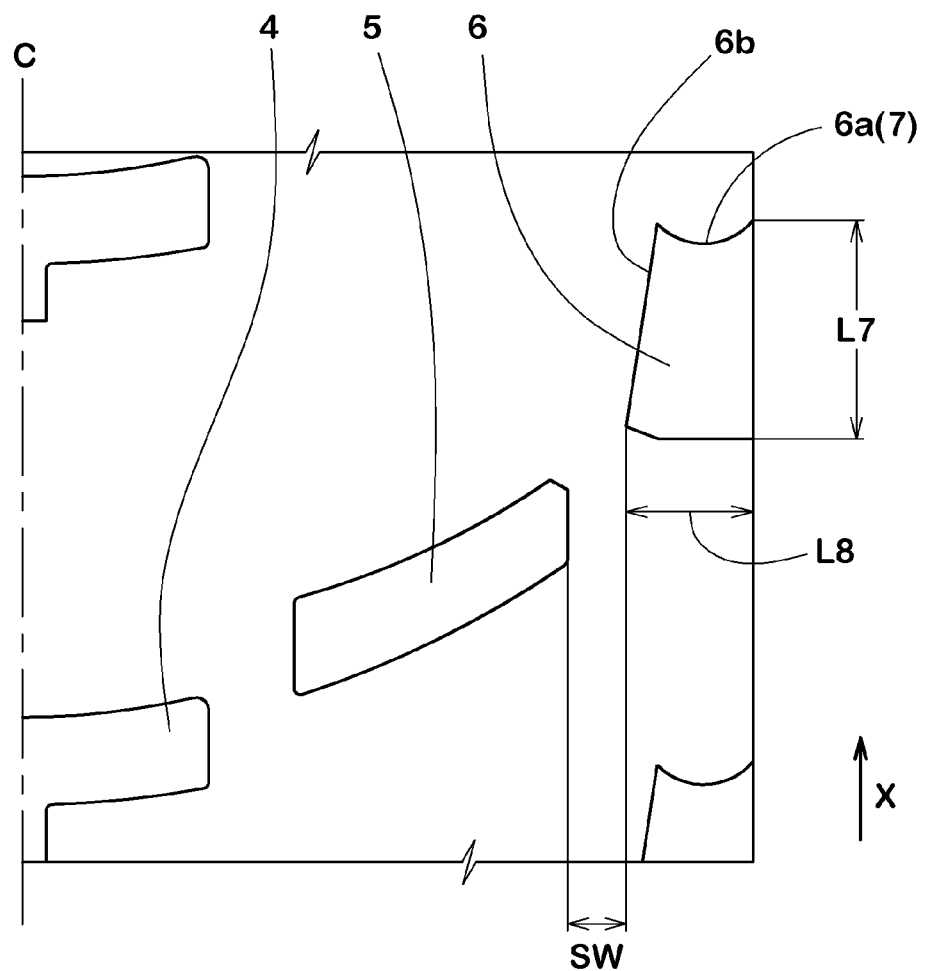
FIG. 3 is a closeup of a tread shoulder portion in FIG. 1.

As shown in FIG. 2, the crown block 4 comprises a main portion 4m and a protruding portion 4t.

The main portion 4m has an axially long shape such that its dimension L2 in the tire axial direction is more than its dimension L1 in the tire circumferential direction. Such crown block 4 is increased in the axial edge component, and the traction performance during straight running can be improved.

The axial dimension L2 of the main portion 4m is preferably set in a range of 20% to 30% of the tread width TW. If the axial dimension L2 of the main portion 4m is less than 20% of the tread width TW, then there is a possibility that the axial edge component becomes insufficient. If the axial dimension L2 of the main portion 4m is more than 30% of the tread width TW, then drainage in a tire equator side is decreased, and the force acting on the crown block 4 when contacting with the ground becomes large, and there is a possibility that the crown block 4 causes excessive leaning deformation in the tire circumferential direction.

In order to prevent the crown block 4 from causing leaning deformation, the circumferential dimension L1 of the main portion 4m is preferably not less than 25% of the axial dimension L2 of the main portion 4m.

However, if the area of the tread S of the crown block 4 is excessively increased, there is a possibility that the crown block 4 can not bite into the earth. Therefore, the circumferential dimension L1 of the main portion 4m is preferably set in a range of not more than 35% of the axial dimension L2 of the main portion 4m.

The protruding portion 4t protrudes from a central portion in the tire axial direction of the main portion 4m toward the opposite direction of the intended tire rotational direction X. Such protruding portion 4t increases the circumferential edge component of the crown block 4, and supports the main portion 4m from the toe-side to prevent the crown block 4 from causing excessive leaning deformation in the tire circumferential direction.

The dimension L3 in the tire circumferential direction of the protruding portion 4t of the crown block 4 is preferably set in a range of from 50% to 65% of the circumferential dimension L1 of the main portion 4m.

If the circumferential dimension L3 is less than 50% of the circumferential dimension L1, it becomes difficult to prevent the leaning deformation of the crown block 4. If the circumferential dimension L3 is more than 65% of the circumferential dimension L1, then wear and tearing-off are be liable to occur in a toe-side part of the protruding portion 4t, and thereby it becomes difficult to prevent the excessive leaning deformation in the tire circumferential direction of the crown block 4.

Preferably, the dimension L4 in the tire axial direction of the protruding portion 4t is set in a range of from 10% to 15% of the axial dimension L2 of the main portion 4m.

If the axial dimension L4 is less than 10% of the axial dimension L2, there is a possibility that excessive leaning deformation in the tire circumferential direction of the crown block 4 can not be prevented. If the axial dimension L4 is more than 15% of the axial dimension L2, the rigidity of the crown block 4 is excessively increased, and it becomes hard to lean the motorcycle body to initiate cornering.

The above-mentioned middle block 5 has an axially long shape such that the dimension L6 in the tire axial direction is larger than the dimension L5 in the tire circumferential direction. Such middle block 5 is increased in the axial edge component, and the traction performance can be improved.

For example, the axial dimension L6 of the middle block 5 is preferably set in a range of from 15% to 25% of the tread width TW.

If the axial dimension L6 of the middle block is less than 15% of the tread width TW, there is a possibility that the axial edge component becomes insufficient. If the axial dimension L6 of the middle block 5 is more than 25% of the tread width TW, there is a possibility that drainage in a tire equator side of the tread portion 2 is decreased.

For preventing the leaning deformation of the middle block 5, it is preferred that the circumferential dimension L5 of the middle block 5 is set in a range of not less than 75% of the axial dimension L6 of the middle block 5.

However, if the area of the tread s of the middle block 5 is excessively increased, there is a possibility that the middle block 5 can not bite into the earth. Therefore, the circumferential dimension L5 of the middle block 5 is preferably set in a range of not more than 85% of the axial dimension L6 of the middle block 5.

If all of the crown blocks 4 and middle blocks 5 in the tread portion 2 are grouped into a plurality of block groups Y each consisting of one crown block 4 and two axially adjacent middle blocks 5 positioned one on each side of the crown block 4, then, in each of the block groups Y, the center P1 of gravity of the crown block 4 is positioned on the toe-side in the intended tire rotational direction X of each of the two middle blocks 5, and the center P2 of gravity of each of the two middle blocks 5 is positioned on the heel-side in the intended tire rotational direction X of the crown block 4.

Therefore, it can be avoided that, when the tread portion is deflected in the ground contacting patch, the crown block 4 contacts with the axially adjacent middle block 5 and they act as if one block since the crown block 4 is circumferentially shifted from each middle block 5.

Further, at least part of soil not trodden down by the middle blocks 5 is lead to on the heel-side of the crown block 4, and trodden down by the crown block 4 whose ground pressure is relatively high. As a result, good traction performance can be obtained.

Accordingly, the tire in this embodiment can be improved in the transitional characteristics during cornering while improving the traction performance on rough terrain.

In order to effectively derive this advantageous effect, in each block group Y in this embodiment, each of the two middle blocks 5 is shifted in the tire circumferential direction from the crown block 4 so that they are not overlapped with each other in the tire circumferential direction.

Thereby, it can be certainly avoided that the crown block 4 and the middle block 5 act as if one block when the tread portion is deflected. Consequently, it is possible to further improve the transitional characteristics during cornering.

Preferably, in each of the block groups Y, the circumferential distance P3 between the center P2 of gravity of the middle block 5 and an intersecting point of the heel-side edge 4a of the crown block 4 with the tire equator C is set in a range of from 13% to 30% of the arrangement pitch P of the crown blocks 4. The arrangement pitch P is given by the circumferential distance between the above-mentioned intersecting points, for example.

In this embodiment, the crown block 4 is not overlapped with each of the two middle block 5 in the tire axial direction, and a space CW is formed therebetween. Such space CW ensures the prevention of the crown block 4 and the middle block 5 from acting as if one block. Further, the spaces CW expedite drainage of water and mud toward the tire circumferential direction, and helps to improve the wet/mud performance. In order to effectively derive such effects, the dimension in the tire axial direction of the space CW is preferably set in a range of from 4% to 10% of the tread width TW.

As shown in FIG. 1, the heel-side edge 4a of the tread s of the crown block 4 and the heel-side edge 5a of the tread s of each middle block 5 each have an arc-shaped part 7 curved convexly toward the opposite direction of the intended tire rotational direction X. Preferably, the arc-shaped part 7 extends over the entire length of the heel-side edge (4a, 5a). Such arc-shaped parts 7 scratch up soil on the heel-side of the arc-shaped parts 7 and pack together so that the packed soil has an increased shearing force. This helps to further improve the traction performance.

Preferably, the heel-side edge 5a of the tread s of each middle block 5 is inclined to the intended tire rotational direction toward the axially outside.

In each block group Y, such middle blocks 5 can lead soil along their heel-side edges 5a toward the toe-side or toward the crown block 4. This helps to further improve the traction performance.

The tread S of each middle block 5 has two axially inner and outer side edges 5b extending parallel with the tire circumferential direction. The tread S of the crown block 4 has two side edges 4b extending parallel with the tire circumferential direction.

In order to improve rigidity balance of each block, it is preferred that the toe-side edge 5c of the tread S of each middle block 5 comprises an arc-shaped part 7, and the toe-side edge 4c of the tread s of the crown block 4 comprises an arc-shaped part 7 (in this embodiment, on each side of the protruding portion 4t).

If all of the crown blocks 4, middle blocks 5 and shoulder blocks 6 in the tread portion 2 are grouped into a plurality of block groups Y' each consisting of the above-mentioned one crown block 4 and two axially adjacent middle blocks 5 and further two shoulder blocks 6 adjacent to the two middle blocks 5, respectively,
then it is preferable that the one crown block 4, two middle blocks 5 and two shoulder blocks 6 in each block group Y' are arranged on a circular arc whose center is positioned on the tire equator C and on the heel-side of the same crown block 4. Such block group Y' scratches up soil and leads the soil along the circular arc toward the toe-side or toward the crown block 4. Consequently, a larger shearing force can be obtained.

The shoulder block 6 has a circumferentially long shape such that the dimension L7 in the tire circumferential direction is larger than the dimension L8 in the tire axial direction. Such shoulder block 6 has a long circumferential edge component, and the traction performance during cornering can be improved.

The axial dimension L8 of the shoulder block 6 is preferably set in a range of from 5% to 15% of the tread width TW.
If the axial dimension L8 of the shoulder block 6 is less than 5% of the tread width TW, it becomes difficult to scratch up the soil. If the axial dimension L8 of the shoulder block 6 is more than 15% the tread width TW, drainage in a tread edge side of the tread portion 2 is decreased.

The circumferential dimension L7 of the shoulder block 6 is preferably set in a range of from 155% to 175% of the axial dimension L8 of the shoulder block 6.
If the circumferential dimension L7 is less than 155% of the axial dimension L8, there is a possibility that the traction performance during cornering can not be improved. If the circumferential dimension L7 is more than 175% of the axial dimension L8, drainage in the tread edge side is decreased.

In this embodiment, each middle block 5 is not overlapped with the adjacent shoulder block 6 in the tire axial direction, and there is a space SW therebetween. Such space SW prevents the middle block 5 and the shoulder block 6 from contacting with each other and acting as if one block. Further, the spaces SW expedite drainage of water and mud toward the tire circumferential direction, and helps to improve the wet/mud performance.
In order to effectively derive such effects, the dimension in the tire axial direction of the space SW is preferably set in a range of from 4% to 10% of the tread width TW.

It is preferable that the heel-side edge 6a of the tread S of the shoulder block 6 comprises an arc-shaped part 7 curved convexly toward the opposite direction of the intended tire rotational direction X. Preferably, the arc-shaped part 7 extends over the entire length of the heel-side edge 6a. Such arc-shaped part 7 scratches up soil on the heel-side of the arc-shaped parts 7 and pack together when running on rough terrain. Thus, the heel-side edge 6a helps to further improve the traction performance.

Preferably, the arc-shaped part 7 of the tread S of the shoulder block 6 has a radius of curvature smaller than that of the crown block 4 and that of the middle block 5. Such shoulder block 6 can pack the soil together on the heel-side of the heel-side edge 6a in spite of a circumferentially long shape.
Even if the shoulder block 6 is subjected to a large force when packing the soil together by the heel-side edge 6a, excessive leaning deformation in the tire circumferential direction of the shoulder block 6 can be prevented since it has a circumferentially long shape.

Preferably, the axially inner side edge 6b of the tread S of the shoulder block 6 is inclined to the axially outside toward the intended tire rotational direction X. Therefore, water and mud are led toward the opposite direction of the intended tire rotational direction X. Each block group Y' scratches up soil and leads the soil along the side edges 6b toward the toe-side or toward the middle blocks 5. Such side edges 6b help to improve the wet performance and the traction performance.

While detailed description has been made of a preferable embodiment of the present invention, the specific embodiment should not be construed as to limit the scope of the present invention; the present invention may be embodied in various forms.

Comparison Tests

Test tires for front wheel (tire size: 80/100-21, rim size: 21×1.85) and rear wheel (tire size: 120/80-19, rim size: 19×2.15) were experimentally manufactured. The test tires were mounted on the front wheel and rear wheel of a 450 cc motocross bike, and both tires were inflated to 80 kPa, a relatively low inflation pressure.

Running the bike in a test course, a professional rider evaluated transitional characteristics during cornering and traction performance into ten ranks. The higher rank number is better.

The test results and specifications of the test tires are shown in Table 1.

TABLE 1

| Tire | Ref. | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| distance P3/pitch P (%) | 0 | 20.0 | 11.0 | 13.0 | 30.0 | 32.6 | 20.0 | 20.0 | 20.0 | 14.5 | 14.5 | 14.5 | 14.5 | 14.5 |
| space CW/tread width TW (%) | 5.2 | 5.2 | 5.2 | 5.2 | 5.2 | 5.2 | 4.0 | 8.5 | 10.0 | 5.2 | 5.2 | 5.2 | 5.2 | 5.2 |
| protruding portion's dimension L3/main portion's dimension L1 (%) | 59.5 | 59.5 | 59.5 | 59.5 | 59.5 | 59.5 | 59.5 | 59.5 | 59.5 | 50.0 | 55.0 | 65.0 | 59.5 | 59.5 |
| protruding portion's dimension L4/main portion's dimension L2 (%) | 12.5 | 12.5 | 12.5 | 12.5 | 12.5 | 12.5 | 12.5 | 12.5 | 12.5 | 12.5 | 12.5 | 12.5 | 10.0 | 15.0 |
| transitional characteristics during cornering | 2 | 7 | 4 | 5 | 8 | 4 | 6 | 8 | 7 | 6 | 8 | 9 | 7 | 8 |
| traction performance | 5 | 6 | 7 | 7 | 6 | 6 | 7 | 6 | 5 | 6 | 6 | 6 | 6 | 6 |

From the test results, it was confirmed that Embodiment tires were improved in the transitional characteristics during cornering and the traction performance.

REFERENCE SIGNS LIST 2 tread portion
3 block
4 crown block
4m main portion
4t protruding portion
5 middle block
X intended tire rotational direction
P1 center of gravity
P2 center of gravity
C tire equator

The invention claimed is:

1. A pneumatic tire for motorcycle for running on rough terrain comprising:
   a tread portion provided with a directional tread pattern having an intended tire rotational direction,
   the tread pattern comprising
crown blocks disposed on the tire equator, and
middle blocks disposed on each side in the tire axial direction of the crown blocks,
   each of the crown blocks comprising
      a main portion having an axially long shape such that the dimension in the tire axial direction is larger than the dimension in the tire circumferential direction, and
      a protruding portion protruding from a central part in the tire axial direction of the main portion toward the opposite direction of the intended tire rotational direction, wherein
      said protruding portion protrudes from a toe-side edge of the tread of the crown block,
      except for said protruding portion, the toe-side edge of the tread of the crown block has an arc-shape curved convexly toward the opposite direction of the intended tire rotational direction, and
      a heel-side edge of the tread of the crown block has an arc-shape curved convexly toward the opposite direction of the intended tire rotational direction,
   wherein
      a heel-side edge of the tread of each of the middle blocks has an arc-shape curved convexly toward the opposite direction of the intended tire rotational direction, and
      a toe-side edge of the tread of said each middle block has an arc-shape curved convexly toward the opposite direction of the intended tire rotational direction, and
   in a block group consisting of a crown block of the crown blocks and two axially adjacent middle blocks disposed one on each side of the crown block,
      a space in the tire axial direction is formed between the crown block and each of the middle blocks,
      the center of gravity of the crown block is positioned on the toe-side of each of the two middle blocks, and
      the center of gravity of each of the two middle blocks is positioned on the heel-side of the crown block.

2. The pneumatic tire according to claim 1, wherein the tread of each of the crown blocks has two axially inner and outer side edges each extending parallel with the tire circumferential direction.

3. The pneumatic tire according to claim 1, wherein the tread of each of the middle blocks has an axially long shape such that the dimension in the tire axial direction is larger than the dimension in the tire circumferential direction.

4. The pneumatic tire according to claim 1, wherein the heel-side edge of the tread of each of the middle blocks is inclined to the intended tire rotational direction toward the axially outside.

5. The pneumatic tire according to claim 1, wherein the tread of each of the middle blocks has two axially inner and outer side edges extending parallel with the tire circumferential direction.

6. The pneumatic tire according to claim 1, wherein
   the tread of each of the crown blocks has two axially inner and outer side edges each extending parallel with the tire circumferential direction, and
   the tread of each of the middle blocks has two axially inner and outer side edges extending parallel with the tire circumferential direction.

7. The pneumatic tire according to claim 1, wherein
   the tread pattern comprises shoulder blocks disposed along each tread edge, and
   the block group and two of the shoulder blocks disposed adjacently to the two middle blocks of the block group are arranged on a circular arc whose center is positioned on the tire equator.

8. The pneumatic tire according to claim 1, wherein each of the shoulder blocks has a circumferentially long shape such that the dimension in the tire circumferential direction is larger than the dimension in the tire axial direction.

9. The pneumatic tire according to claim 1, wherein a space in the tire axial direction is formed between each of the middle blocks and the adjacent shoulder block.

10. The pneumatic tire according to claim 1, wherein an axially inner side edge of the tread of each of the shoulder blocks is inclined to the axially outside toward the intended tire rotational direction.

* * * * *